United States Patent [19]

Dandreaux et al.

[11] Patent Number: 5,504,129
[45] Date of Patent: Apr. 2, 1996

[54] DISPERSION AND METHOD FOR PRODUCING SAME

[75] Inventors: Gary F. Dandreaux, Bloomfield, N.J.; John T. Geoghegan, Port Chester, N.Y.; Long S. Wang, New City, N.Y.; Lori S. Slovik, Monroe, N.Y.; John H. Hung, Fort Lee, N.J.

[73] Assignees: International Paper Company, Purchase, N.Y.; Arizona Chemical Company, Panama City, Fla.

[21] Appl. No.: 164,030

[22] Filed: Dec. 8, 1993

Related U.S. Application Data

[63] Continuation-in-part of Ser. No. 911,778, Jul. 10, 1992, abandoned, which is a continuation-in-part of Ser. No. 850,043, Mar. 12, 1992, abandoned.

[51] Int. Cl.$^6$ .................................................... C08J 11/24
[52] U.S. Cl. ........................ 524/270; 524/277; 524/445; 524/478; 524/488; 523/337; 523/339; 525/386
[58] Field of Search ............................ 524/270, 277, 524/445, 478, 488, 801; 523/337, 339; 525/386

[56] References Cited

U.S. PATENT DOCUMENTS

| | | | |
|---|---|---|---|
| 3,417,040 | 12/1968 | Kremer et al. | 524/272 |
| 3,522,081 | 7/1970 | Moyer et al. | 428/486 |
| 4,117,199 | 9/1978 | Gotoh et al. | 428/486 |
| 4,259,411 | 3/1981 | Windhager et al. | 428/511 |
| 4,370,389 | 1/1983 | Ogura et al. | 428/511 |
| 4,670,504 | 6/1987 | Cardenas et al. | 524/504 |
| 4,842,691 | 6/1989 | Nakajima et al. | 162/158 |
| 5,017,416 | 5/1991 | Imperial et al. | 428/195 |
| 5,201,944 | 4/1993 | Nakata et al. | 106/144 |

FOREIGN PATENT DOCUMENTS

| | | |
|---|---|---|
| 50-036711 | 4/1975 | Japan . |
| 105388 | 6/1982 | Japan . |

OTHER PUBLICATIONS

Pp. 472 through 479 entitled "Waxes". Kirk Othmer (1984).

Primary Examiner—Paul R. Michl
Assistant Examiner—John J. Guarriello
Attorney, Agent, or Firm—Luedeka, Neely & Graham

[57] ABSTRACT

The specification discloses an aqueous dispersion for coatings consisting essentially of water and a water dispersible component, wherein the water dispersible component is provided by reacting maleic anhydride with a rosin ester to provide a maleated rosin ester, adding wax and preferably also an ethylene vinyl acetate copolymer to the maleated rosin ester, and adding a tertiary amino alcohol to the mixture to yield the water dispersible component as a reaction product thereof. When used in a coating formulation for paper, clay and/or latex may be added to the formulation. In one preferred embodiment, the dispersion is applied as a coating to paper to enhance toner adhesion to the surface of the paper while also providing a relatively low friction surface.

16 Claims, No Drawings

DISPERSION AND METHOD FOR PRODUCING SAME

This application is a continuation-in-part application Ser. No. 07/911,778 now abandoned filed Jul. 10, 1992, which is a continuation-in-part of U.S. application Ser. No. 07/850,043, filed Mar. 12, 1992, now abandoned.

The present invention relates generally to dispersions for use in coatings and adhesives. More particularly, the present invention relates to dispersions for coating substrates to provide low friction surfaces, surfaces having improved toner adhesion, and surfaces having improved barrier properties.

There exists a wide variety of coating formulations for paper and board substrates; i.e., cellulose webs, to impart properties desired for various end uses. For example, it is known to add a wax or wax-like coatings; e.g., EVA, for improving the barrier properties for applications demanding water repellency or in humid environments. Generally speaking, such coatings do not improve and in many cases interfere with subsequent printing operations. Other coatings are known for reducing the friction of paper surfaces, but these also suffer from the disadvantage of reduced printability as compared with the uncoated surface.

Still other coatings are known for imparting adhesive properties to papers ("pressure sensitive coatings") often through use of various resins which confer the desired "stickiness" for the end use. Pressure sensitive coatings incorporating resins are generally not printable and due to their adhesiveness generally require a covering sheet or layer for handling purposes until they are ready for use.

It is therefore an object of the invention to provide a dispersion for use in coating formulations for improving the properties of paper and board products.

It is yet another object of the invention to provide a dispersion for coating formulations for paper and board products which provides improved printability and a relatively low friction surface.

Still another object of the invention is to provide a water dispersible material for use in coating and adhesive formulations to improve the properties of such formulations.

Yet another object of the invention is to provide a dispersion for coating and adhesive formulations of the character described which is manufactured by conventional methods with readily available relatively inexpensive materials.

Having regard to the above and other objects, the present invention is directed to an aqueous dispersion and coating formulations for paper and board products incorporating the aqueous dispersion, to the products coated thereby, and to methods of manufacturing the coated products. In accordance with one aspect of the invention, an aqueous dispersion is provided consisting essentially of water and a water dispersible component, wherein the water dispersible component is provided by reacting maleic anhydride (2,5-furandione) with a rosin ester to provide a maleated rosin ester, adding a wax to the maleated rosin ester, and adding a tertiary amino alcohol to the wax and maleated rosin ester to yield the water dispersible component as a reaction product thereof. The term "rosin ester" will be understood to include esterified forms of gum rosin, wood rosin, tall oil rosin, modified or natural resins such as aromatic modified terpene resins and terpene resins, as well as natural or synthetic resins. A preferred rosin ester for use in the present invention is derived by reacting rosin with a polyhydric alcohol, e.g. glycerine, pentaerythritol, ethylene glycol, and the like. A particularly preferred rosin ester for preparation of the dispersion is the rosin ester available under the name Zonester® 100 from Arizona Chemical Co. of Panama City, Fla. Zonester® 100 is a pentaerythritol ester of Acintol® R type tall oil rosin (also available from Arizona Chemical Co.). Zonester® 100 has a softening point of 94° C., an acid value of 8, and a specific gravity (25°/25° C.) of 1.06.

The reaction of Zonester® 100 with maleic anhydride is believed to be generally as follows:

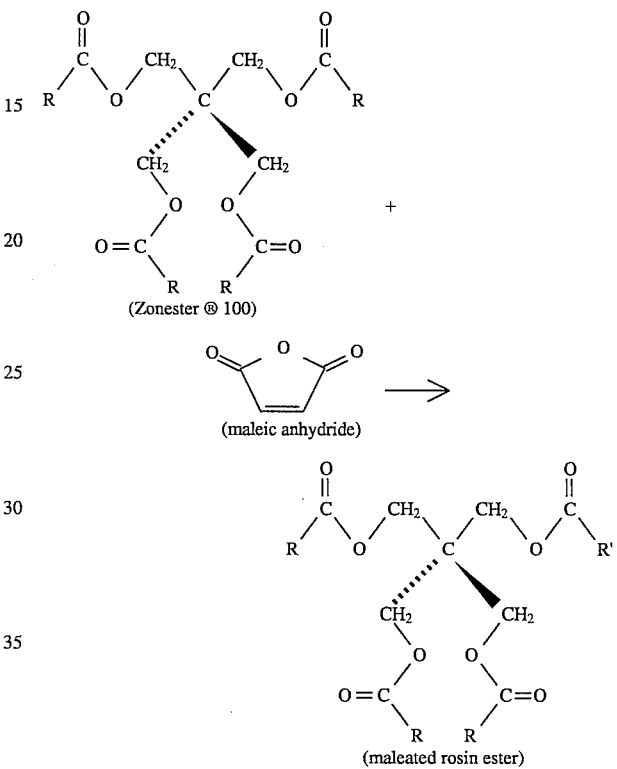

where

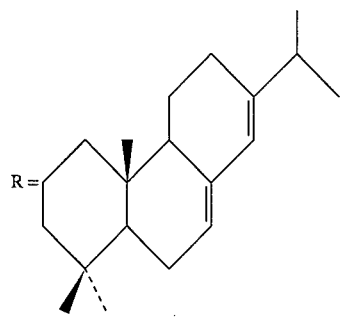

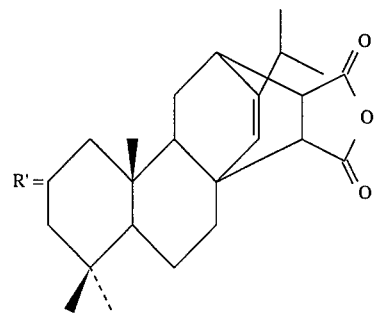

The wax component is preferably a petroleum wax, e.g., paraffin, microcrystalline, semi-microcrystalline, and equivalents, or synthetic wax, e.g., polyethylene, Fischer-Tropsch, chemically modified hydrocarbon, substituted amide, and equivalents. Particularly preferred waxes include a petroleum wax available under the name Aristowax® from Frank B. Ross Co. of Jersey City, N.J., and an acid functionalized low molecular weight polyethylene wax having an acid number of 16 available under the name Epolene® E-15 from Eastman Chemicals of Kingsport, Tenn.

The wax is mixed with the maleated rosin ester, preferably while heating, and the resulting composition is reacted with the tertiary amino alcohol, preferably N,N-dimethylethanolamine (DMEA), to form a reaction product which is readily dispersible in water. The amount of DMEA used is generally between about 1 and 15% of the weight of solids used and for low friction coatings is preferably between about 6 and 8%.

The reaction of the R' branch of the maleated rosin ester with DMEA is believed to occur as follows:

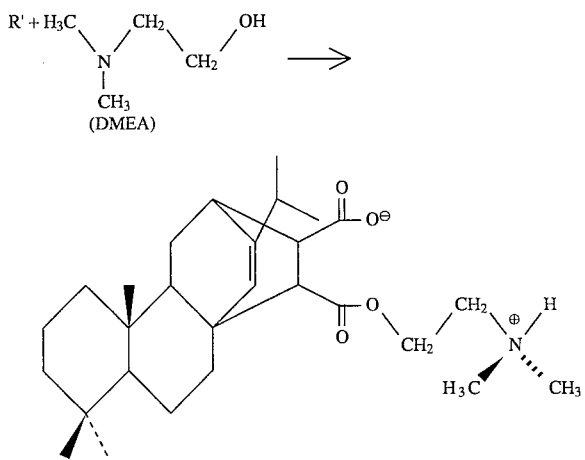

The dispersion also provides an improved low friction surface for paper when formed with an ethylene-vinyl acetate copolymer (EVA) to provide a formulation which may be applied, as by coating, onto paper to provide low friction properties and, surprisingly, improved toner adhesion in printing applications. For this application, a suitable EVA has a melt index of between about 1 and 500 dg/min., preferably between about 100 and 500 dg/min., and a vinyl acetate content of between about 5 and 95%, preferably between about 15 and 40%. A preferred commercially available EVA is available under the name ELVAX® 220 DuPont Co., having a vinyl acetate content of 28% and a melt index of 150 dg/min.

In some instances (see Examples 4, 5 below), an EVA/wax (non-acid functionalized wax) mixture may be maleated and combined with the maleated rosin ester for reaction with DMEA. In this situation, it is believed that the wax and the DMEA do not react and that the extent of reaction of maleic anhydride with the blend is only about 5%. This reaction is believed to occur with vinyl alcohol repeating units in the EVA and the actual structure of the reaction product is unknown, but the product is water dispersible and, thus, useful as a coating component according to the invention.

It has been found that the dispersion is particularly useful when combined with clay and/or latex and applied as a coating to paper to provide a low friction surface which enhances the ability of a printer to pick up the paper one at a time for printing and which also provides improved toner adhesion. Latexes which may be used include the acrylic polymer available under the name Rhoplex® N-495 from Rohm & Haas, the vinyl acetate-acrylate copolymer available under the name Synthemul® 40551 from Riechhold, the styrene/butadiene latex available under the name Goodrite® 1800×73 from BF Goodrich, the ethylene/vinyl chloride available under the name Airflex® 4814 from Air Products and Chemicals, the vinyl acetate/ethylene available under the name Airflex® 100 HS from Air Products and Chemicals, the carboxylated styrene/butadiene latex available under the name DOW® 620NA from Dow Chemical, and the polyvinyl acetate available under the name Fuller® PDo62 from HB Fuller Co.

Dispersions according to the present invention are particularly suitable for coating paper which is to be printed by ion deposition. Particularly, the dispersions may be combined with latex and/or clay and applied to paper, particularly heavier paper of the type used to provide automated tickets and boarding passes, to improve toner adhesion and to reduce friction. Automated ticket and boarding pass stock typical has a weight of about 99 lb/3000 ft$^2$. However, it will be understood that the present invention may also be useful for other weight papers, such as reprographic paper having a weight of about 46 lb/3000 ft$^2$, envelope paper having a weight of about 55 lb/3000 ft$^2$, and tag stock having a weight of about 125 lb./3000 ft.$^2$.

The total solids content of the dispersion is generally in the range of from about 10 and 80%. When an EVA is added to the dispersion and the resulting formulation applied to a substrate, such as ticket stock, to provide a low friction coating, the solids content of the coating formulation is preferably between about 45 and 60%. Also, for this application, the ratio of EVA/wax/rosin is preferably about 1/1/2 and the dispersion may comprise between about 10% to 90%, preferably between about 10 and 40%, of the total weight of the coating formulation, on dry basis. For applications wherein the dispersion does not include EVA or a similar component, the wax and rosin ester are preferably provided in equal amounts.

Coating compositions incorporating the dispersions of the present invention are preferably applied in coating weights (dried) of between about 0.5 and 5.0 lbs/side/(3000 ft$^2$) using conventional coating techniques, such as spraying, brushing, foaming, roll coating, flexo coating, offset gravure coating, blade coating, and knife coating. The coated paper is preferably dried to a moisture content of between about 4.5 and 5.5 percent by weight before printing. For a coating containing both clay and latex, the clay is preferably present in an amount of from about 20 to about 40 percent by weight of the solids and the latex is preferably present in an amount from about 30 to about 50 percent by weight of the solids.

Examples 1–7 are provided below to illustrate preparation of dispersions and water dispersible materials in accordance with the present invention.

EXAMPLE 1

A 5 liter three neck flask equipped with a temperature controller, thermocouple, overhead stirrer, heating mantle and condenser was charged with 2822 grams of Zonester® 100 (rosin ester) and the rosin ester was heated to 180° C. Then, 113 grams of maleic anhydride powder was slowly added to the flask. After the addition of maleic anhydride, the temperature was maintained at 240° C. for 4 hours. Any unreacted maleic anhydride was removed by purging with nitrogen for 2 hours while maintaining the temperature at 240° C. The resulting maleated rosin ester contained 2.92% maleic anhydride and was observed to have a softening point of 110° C.

A one liter flask equipped with a temperature controller, thermocouple, overhead stirrer, heating mantle, and condenser was charged with 125 grams of the maleated rosin ester provided above, 62.5 grams of Elvax® 220 (EVA), and 62.5 grams Epolene® E-15 (wax). The mixture was heated to 150° C. and stirred until homogeneous and cooled to about 130° C. Then, 15 grams of N,N-dimethylethanolamine was then added and the temperature maintained at 120° C. for 10 minutes after which time the temperature was reduced to about 98° C. Then, 375 grams of boiling water was slowly added to the resulting mixture over a twenty minute period and the temperature was maintained at about 98° C., after which time the mixture was cooled to room temperature to provide an aqueous dispersion having a solids content of about 38.9%, a viscosity of about 70 cp, and an average particle size of about 1.20 μm.

EXAMPLE 2

The procedure of Example 1 was repeated using Elvax® 210 in place of Elvax® 220. Elvax® 210 is an EVA available from DuPont having a vinyl acetate content of 28% and a melt index of 400 dg/min. The resulting dispersion was observed to have an average particle size of about 1.27 μm and a solids content of about 39.2%.

EXAMPLE 3

A three neck flask equipped with a temperature controller, thermocouple, overhead stirrer, heating mantle and condenser was charged with 125 grams of the maleated rosin ester of Example 1 and 125 grams of Epolene® E-15. The mixture was heated to 150° C. with stirring and held at this temperature until homogeneous.

The mixture was then cooled to about 130° C. and 15 grams of N,N-dimethylethanolamine was added. The temperature of the mixture was then maintained at 120° C. for 10 minutes and thereafter the temperature was reduced to about 98° C. Then, 375 grams of boiling water was added to the mixture over a twenty minute period while the temperature was maintained at about 98° C. After this, the dispersion was cooled to room temperature and was observed to have a solids content of about 38.4% pH of 9.5, and an average particle size of about 2.10 μm.

EXAMPLE 4

A mixture of Elvax® 220 and Aristowax® 165 was provided by combining 500 grams each of Elvax® 220 and Aristowax® 165 and heating the mixture to about 190° C. Then, 50 grams of maleic anhydride was added to this mixture, after which the temperature was maintained at 190° C. for four hours. Following this, any unreacted maleic anhydride was removed from the mixture by purging with nitrogen for 3.5 hours at 200° C.

A flask was charged with 125 grams of the maleated rosin ester of Example 1 and 125 grams of the maleated Elvax® 220/Aristowax® 165 mixture, and the resulting mixture was heated to 150° C. and stirred until homogeneous. This mixture was then cooled to about 125° C. and 15 grams of DMEA was added. The temperature of the mixture was maintained at about 120° C. for 10 minutes and then lowered to about 98° C., after which 320 grams of boiling water was added over a twenty minute time period while the temperature was maintained at about 98° C. After completion of the water addition, the dispersion was cooled to room temperature. The resulting dispersion was observed to have an average particle size of about 4.92 μm.

EXAMPLE 5

A homogeneous mixture of 125 grams of the maleated rosin ester of Example 1 and 125 grams of Elvax 220/Aristowax 165 was prepared as in Example 4. This mixture was then cooled to about 125° C. and 20 grams of dimethylethanolamine (DMEA) was added. The temperature of the resulting mixture was maintained at about 120° C. for 10 minutes and then lowered to about 98° C. Then, 375 grams boiling water was added to the mixture over a twenty minute time period while the temperature was maintained at about 98° C. After the water addition was complete, the dispersion was cooled to room temperature. The resulting dispersion was observed to have an average particle size of about 1.90 μm.

EXAMPLE 6

A one liter flask equipped with a temperature controller, thermocouple, overhead stirrer, heating mantle and condenser, was charged with 125 grams of the maleated rosin ester of Example 1, 62.5 grams Elvax® 220 and 62.5 grams Aristowax® 165. The mixture was heated to 180° C. with stirring and held at this temperature until the mixture was homogeneous. The mixture was then cooled to about 110° C., and 20 grams of dimethylethanolamine added. The temperature of the mixture was raised to 120° C. and held for 10 minutes, after which time the temperature was lowered to about 98° C. Then, 375 grams boiling water was added to the mixture over about a twenty minute time period while the temperature was maintained at about 98° C. After the water addition was complete, the dispersion was cooled to room temperature. The resulting dispersion was observed to have an average particle size of 1.00 μm.

EXAMPLE 7

A one liter flask equipped with a temperature controller, thermocouple, overhead stirrer, heating mantle and condenser, was charged with 125 grams of the maleated rosin ester of Example 1, 62.5 grams Elvax® 210 and 62.5 grams Aristowax® 165. The mixture was heated to 150° C. with stirring and held at this temperature until the mixture was homogeneous. The mixture was then cooled to about 130° C. and 20 grams of DMEA was added. The temperature of the mixture was held at 120° C. for 10 minutes and then cooled at about 98° C. Then, 375 grams boiling water was added over about a twenty minute period while the temperature was maintained at about 98° C. After the water addition was complete, the dispersion was cooled to room temperature. The resulting dispersion had an average particle size of 1.67 μm.

Tables 1, 2, and 3 illustrate various advantages associated with use of the dispersion in coating formulations applied to paper. Table 1 provides data relating to the static coefficient of friction (SCOF) for three samples. Table 2 provides data relating to the kinetic coefficient of friction (KCOF) for the same three samples. Table 3 provides data relating to toner adhesion for the same three samples. In each case, sample 1 is ordinary starch surface sized paper stock (uncoated) having a basis weight of 46 lbs/ream (3000 ft$^2$). Sample 2 is the stock of sample 1 which has been coated on both sides with a conventional polymeric latex coating (Rhoplex N-495). Sample 2 had a coating weight of 1.54 lbs/side/3000 ft$^2$ and the coating was applied using a metering blade size press. Sample 3 is the stock of Sample 1 coated on both sides with a coating composition made in accordance with the present invention. Sample 3 had a coating weight of 1.69 lbs/side/3000 ft² and the coating was applied using a metering blade size press. The coating of Sample 3 contained (by weight solids) 68 percent Rhoplex-495, 30 percent filler clay, and 2 percent of the dispersion of Example 1.

Samples 1, 2 and 3 were printed using two different ion deposition printers. Printer 1 was the ion deposition printer available under the name CIE 3000 from C. Itoh, using a polyethylene based toner available under the name TNRI supplied by the printer manufacturer. Printer 2 was the ion deposition printer available under the name Apollo Printer from SCI, using a polyethylene/vinyl acetate based toner available under the name RP-1329 from Coates.

TABLE 1

| Sample | Static Coefficient of Friction (SCOF) |
|---|---|
| 1 | 0.5525 |
| 2 | 0.6825 |
| 3 | 0.6050 |

TABLE 2

| Sample | Kinetic Coefficient of Friction (KCOF) |
|---|---|
| 1 | 0.4370 |
| 2 | 0.4835 |
| 3 | 0.4080 |

TABLE 3

| | Toner Adhesion | |
|---|---|---|
| Sample | Printer 1 | Printer 2 |
| 1 | 42 | 50 |
| 2 | 93.5 | 86 |
| 3 | 97 | 89 |

The data in Table 1 was obtained using a slip and friction tester available from Testing Machine, Inc. and is of a type which is well known in the art for friction testing. As can be seen, the SCOF of the untreated stock (Sample 1) is lower than the SCOF of either of the coated stocks, however, the SCOF increase of the stock coated with the coating of the present invention (Sample 3) is about 60 percent lower than that of the conventionally coated stock (Sample 2).

The data in Table 2 was also obtained using a slip and friction tester according to standard test procedures. As can be seen, the KCOF of the stock coated with the coating of the present invention (Sample 3) was considerably lower than that of the untreated stock (Sample 1) and the conventionally treated stock (Sample 2).

The data in Table 3 was obtained in accordance with standard scotch tape test techniques utilizing 3M Scotch 811 brand tape, such as described in U.S. Pat. No. 5,017,416, incorporated herein by reference. In this test, the tape is applied over the printed surface and is then pressed with a 1 kilogram brass roller approximately 3 inches in diameter and 1 inch wide, which is rolled across the tape 1 time. The tape is then peeled away from the paper at a 90° or greater angle. The diffused reflection density is measured before the tape is applied to the printed surface and again after the tape is removed from the printed surface, and the ratio of the final density to the initial density is reported as the toner adhesion. The density is measured using a suitable instrument such a Macbeth Densitometer R107 or equivalent apparatus.

As can be seen, toner adhesion for the stock coated with the coating of the present invention (Sample 3) was better than that of the untreated stock (Sample 1) and the conventionally coated stock (Sample 2) on both printers. It is particularly unexpected that the coating of the invention produces improved toner adhesion and, at the same time, materially reduces the friction coefficients of the paper.

In Table 4 shown below, dispersions were used to coat one side of a 99 lb sized stock at coating weight of 1 lb/side/3000 ft² (after drying). The dispersions were made in accordance with Example 1, except where the EVA was omitted. The dispersion without EVA was made in accordance with Example 3. The coated stock was printed with an Apollo ion deposition printer available from SCI using a polyethylene/vinyl acetate based toner available under the name RP-1329 from Coates.

TABLE 4

| | Rhoplex-N495 | dispersion component | Clay | Toner Adhesion (%) | SCOF/KCOF |
|---|---|---|---|---|---|
| (conventional) | 60 | 0 | 40 | 87.7 | .415/.351 |
| | 54 | 10 | 36 | 93.6 | .407/.306 |
| | 45 | 25 | 30 | 94.4 | .383/.274 |
| (preferred) | 30 | 50 | 20 | 94.1 | .309/.238 |
| | 0 | 100 | 0 | 92.5 | .333/.262 |
| (conventional) | 65 | 0 | 35 | 89.7 | .382/.319 |
| | 0 | 65 | 35 | 90.6 | .333/.254 |
| | 25 | 40 | 35 | 93.4 | .322/.255 |
| | 35 | 30 | 35 | 91.5 | .306/.249 |
| | 0 | 65* | 35 | 86.8 | .325/.258 |
| | 25 | 40* | 35 | 89.1 | .299/.238 |
| | 35 | 30* | 35 | 88.8 | .330/.272 |
| (uncoated control) | 0 | 0 | 0 | 45.0 | .373/.291 |

*EVA omitted

The results in Table 4 indicate that excellent results may be obtained using a coating containing, on a dry basis, 50 percent of the dispersion of Example 1, 30 percent Rhoplex-N495 and 20 percent filler clay. This provides a coating having greatly enhanced toner retention and, surprisingly, lower kinetic and static coefficients of friction as compared to uncoated paper and conventionally coated paper.

The effect of the coating weight on toner adhesion and the coefficients of friction is demonstrated in Table 5. In each case, dispersions were used to coat one side of a 99 lb sized stock at the coating weights indicated (after drying). The dispersions in each case were made in accordance with Example 1, except where the EVA was omitted. The dispersion without EVA was made in accordance with Example 3. The coated stock was printed with an Apollo ion deposition printer available from SCI using a polyethylene/vinyl acetate based toner available under the name RP-1329 from Coates.

TABLE 5

| | Rhoplex-N495 | dispersion component | Clay | Coat wt. (lb/side/3000 ft²) | Toner/adhesion % | SCOF/KCOF |
|---|---|---|---|---|---|---|
| (conventional) | 65 | 0 | 35 | 1 | 89.7 | .578/.387 |
| (conventional) | 65 | 0 | 35 | 2 | 90.9 | .808/.479 |
| | 25 | 40 | 35 | 1 | 92.7 | .332/.253 |
| | 25 | 40 | 35 | 2 | 94.3 | .521/.302 |

TABLE 5-continued

| | Rhoplex-N495 | dispersion component | Clay | Coat wt. (lb/side/ 3000 ft²) | Toner/ adhesion % | SCOF/ KCOF |
|---|---|---|---|---|---|---|
| | 25 | 40* | 35 | 1 | 89.1 | .299/.238 |
| | 25 | 40* | 35 | 2 | 92.6 | .343/.271 |
| (coated control) | 0 | 0 | 0 | 0 | 45.0 | .373/.291 |

*EVA omitted

As can be seen, the results in Table 5 show that the samples coated using the dispersions of the present invention have improved toner adhesion as compared to the uncoated sample and toner adhesion comparable to, if not better than, the toner adhesion achieved using a conventional coating. Furthermore, the samples coated using the dispersions of the present invention have significantly lower friction as compared to the samples coated with an equal weight of a conventional coating, and in fact, provide lower friction even when applied in greater coating weights.

The usefulness of several different polymer latexes with the dispersions of the present invention was investigated by testing the toner retention and coefficients of friction for coatings prepared with different polymers with and without the rosin ester dispersion. The measured toner retention (%R) and coefficients of friction (SCOF/KCOF) are shown in Table 6. The change in toner retention (Δ %R) and the change in static coefficient of friction (ΔSCOF) and kinetic coefficient of friction (ΔKCOF) are shown in Table 7. In Tables 6 and 7, tests were conducted with coating formulations having, by weight, 35% clay and 65% of the polymer indicated (i.e. no dispersion) and coatings having 35% clay, 60% of the polymer indicated, and 5% of the dispersion of Example 1. Samples were printed with an Apollo ion deposition printer available from SCI using a polyethylene/vinyl acetate based toner available under the name RP-1329 from Coates.

TABLE 6

TONER RETENTION (% R) AND COF OF VARIOUS POLYMER COATINGS

| Coating [35% clay + (65% polymer) or (60% polymer + 5% rosin ester dispersion)] | Coat Weight (#/3000) (dried) | With 5% rosin ester dispersion % R SCOF/KCOF | Without rosin ester dispersion % R SCOF/KCOF |
|---|---|---|---|
| Synthemul 40551 | 1 | 82.9 .439/.293 | 80.0 .478/.356 |
| | 2 | 91.4 .437/.275 | 89.0 .642/.408 |
| Goodrite 1800x73 | 1 | 86.0 .410/.299 | 82.2 .500/.369 |
| | 2 | 90.8 .479/.311 | 90.1 .719/.469 |
| Airflex 4814 | 1 | 80.3 .351/.280 | 78.6 .409/.320 |
| | 2 | 89.7 .333/.264 | 90.3 .466/.354 |
| Airflex 100 HS | 1 | 78.6 .413/.303 | 80.4 .427/.348 |
| | 2 | 86.9 .447/.291 | 81.7 .496/.373 |
| Dow 620NA | 1 | 87.4 .364/.287 | 85.1 .486/.365 |
| | 2 | 93.0 .438/.255 | 91.5 .546/.435 |
| Fuller PD062 | 1 | 62.8 .375/.277 | 54.1 .432/.338 |
| | 2 | 63.7 .371/.278 | 52.3 .462/.359 |
| Rhoplex N-495 | 1 | 88.7 .528/.355 | 87.0 .604/.442 |
| | 2 | 93.0 .622/.319 | 92.1 .736/.466 |

TABLE 7

Effect of Coating Additive on Toner Retention and COF

| Coating [35% clay + (65% polymer) or (60% polymer + 5% rosin ester dispersion)] | Coat Weight (#/3000) | Δ % R* | Δ SCOF* | Δ KCOF* |
|---|---|---|---|---|
| Synthemul 40551 | 1 | +2.1 | −0.039 | −0.063 |
| | 2 | +2.4 | −0.205 | −0.133 |
| Goodrite 1800x73 | 1 | +3.8 | −0.090 | −0.070 |
| | 2 | +0.7 | −0.240 | −0.158 |
| Airflex 4814 | 1 | +1.7 | −0.058 | −0.040 |
| | 2 | −0.6 | −0.133 | −0.090 |
| Airflex 100 HS | 1 | −1.8 | −0.014 | −0.045 |
| | 2 | +5.2 | −0.049 | −0.082 |
| Dow 620NA | 1 | +2.3 | −0.122 | −0.078 |
| | 2 | +1.5 | −0.108 | −0.180 |
| Fuller PD062 | 1 | +8.7 | −0.057 | −0.061 |
| | 2 | +11.3 | −0.091 | −0.081 |
| Rhoplex N-495 | 1 | +1.7 | −0.076 | −0.087 |
| | 2 | +0.9 | −0.114 | −0.147 |

*Δ = the difference between a coating with and a coating without the rosin ester dispersion As can be seen from the results of Tables 6 and 7, dispersions according to the invention may be used with various polymers to provide materially improved properties, particularly at the lower coat weights. Virtually without exception, toner retention is increased while friction is decreased when the dispersion is used. It is unexpected to find that addition of a material which improves toner adhesion would also reduce friction. It is also surprising that dispersions according to the invention, which contain an appreciable amount of wax improve toner adhesion since wax would generally be expected to interfere with adhesion of the toner.

The dispersions are also useful as a barrier coating. The following Example 8 demonstrates the usefulness of the present invention in this capacity.

EXAMPLE 8

Kraft stock having a weight of 50 lb/3000 ft is coated with the dispersion of Example 1. The coating is dried at 230° F. for 30 seconds to a coating weight of 7.4 lbs/3000 ft². The water vapor transmission rate through the coated stock is 31 grams/(100 in²−24 hours) vs greater than 100 grams/(100 in²−24 hours) for the uncoated stock.

The foregoing description of certain embodiments of the present invention has been provided for purposes of illustration only, and it is understood that numerous modifications or alterations may be made without departing from the spirit and scope of the invention as defined in the following claims.

What is claimed is:

1. An aqueous dispersion comprising water and a water dispersible component dispersed therein, wherein said water dispersible component is provided by reacting maleic anhydride with a rosin ester to provide a maleated rosin ester, combining wax with the maleated rosin ester to provide a wax/maleated rosin ester mixture and reacting the wax/maleated rosin ester mixture with a tertiary amino alcohol.

2. The dispersion of claim 1, wherein ethylene vinyl acetate copolymer is added with the wax.

3. The dispersion of claim 1, wherein the tertiary amino alcohol is N,N dimethylethylanolamine.

4. The dispersion of claim 1, wherein said rosin ester comprises a rosin ester derived from the reaction of rosin with a polyhydric alcohol.

5. The dispersion of claim 1, wherein said wax comprises an acid-functionalized wax.

6. An aqueous dispersion comprising water and a water dispersible component, wherein said water dispersible component is provided by reacting maleic anhydride with a rosin ester to provide a maleated rosin ester, combining wax and ethylene vinyl acetate copolymer with the maleated rosin ester to provide an EVA/wax/maleated rosin ester mixture, and reacting the EVA/wax/maleated rosin ester mixture with a tertiary amino alcohol.

7. The dispersion of claim 5, wherein the tertiary amino alcohol is N,N dimethylethylanolamine.

8. The dispersion of claim 5, wherein said rosin ester comprises a rosin ester derived from a reaction between rosin and a polyhydric alcohol.

9. The dispersion of claim 5, wherein said wax comprises an acid-functionalized wax.

10. A method for producing a water dispersible material for use in paper coating formulations to improve the properties of the formulations, said method comprising reacting maleic anhydride with a rosin ester to provide maleated rosin ester, combining wax with the maleated rosin ester to provide a wax/maleated rosin ester mixture and reacting the wax/maleated rosin ester mixture with a tertiary amino alcohol.

11. The method of claim 10, wherein said wax is reacted with maleic anhydride prior to being added to the maleated rosin ester.

12. A method for producing a water dispersible material for use in paper coating formulations to improve the properties of the formulations, said method comprising reacting maleic anhydride with a rosin ester to provide maleated rosin ester, combining wax and ethylene vinyl acetate with the maleated rosin ester to provide an EVA/wax/maleated rosin ester mixture and reacting the EVA/wax/maleated rosin ester mixture with a tertiary amino alcohol.

13. The method of claim 11, wherein said wax and EVA are reacted with maleic anhydride prior to being added to the maleated rosin ester.

14. The method of claim 12, further comprising the step of combining water with the EVA/wax/maleated rosin ester mixture following the step of reacting the EVA/wax/maleated rosin ester mixture with a tertiary amino alcohol.

15. The method of claim 14, wherein said step of combining water comprises combining boiling water.

16. The dispersion of claim 1, wherein the step of combining wax with the maleated rosin ester comprises combining wax with rosin eater to provide a wax/rosin ester mixture and reacting the wax/rosin ester mixture with maleic anhydride.

* * * * *

UNITED STATES PATENT AND TRADEMARK OFFICE
CERTIFICATE OF CORRECTION

PATENT NO. : 5,504,129
DATED : April 2, 1996
INVENTOR(S) : Gary F. Dandreaux, John T. Geoghegan, Long S. Wang, S. Slovik, John H. Hung It is certified that error appears in the above-indentified patent and that said Letters Patent is hereby corrected as shown below:

In the Claims:

Col. 10, <u>Claim 3</u>. line 62, change "N,N-dimethylethylanolamine" to -- N,N-dimethyl ethanolamine --

Col. 11, <u>Claim 7</u>. line 10, change "N,N-dimethylethylanolamine" to -- N,N-dimethyl ethanolamine --

Col. 12, <u>Claim 16</u>. line 22, change "eater" to -- ester

Column 6, line 7, change "Elvax" to --Elvax® --

Column 6, line 8, change "Aristowax" to -- Aristowax®"

Column 4, line 12, change "PDo62" to -- PD062 --

Column 7, line 67, change "such a" to -- such as a --

Column 9, line 9, change "coated" to -- uncoated --.

Signed and Sealed this

Eighth Day of October, 1996

Attest:

BRUCE LEHMAN

*Attesting Officer*　　　Commissioner of Patents and Trademarks